United States Patent
Tomii et al.

(10) Patent No.: US 8,417,970 B2
(45) Date of Patent: Apr. 9, 2013

(54) APPARATUS AND METHOD FOR STORING KEY DATA, LIBRARY UNIT, AND STORAGE DEVICE

(75) Inventors: Daisuke Tomii, Kawasaki (JP); Shinobu Sasaki, Kawasaki (JP); Koujiro Hashimoto, Kawasaki (JP); Noriyuki Suzuki, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 300 days.

(21) Appl. No.: 12/792,964

(22) Filed: Jun. 3, 2010

(65) Prior Publication Data

US 2011/0010565 A1 Jan. 13, 2011

(30) Foreign Application Priority Data

Jul. 7, 2009 (JP) ................................. 2009-160431

(51) Int. Cl.
- *G06F 11/30* (2006.01)
- *G06F 12/14* (2006.01)
- *G06F 13/00* (2006.01)
- *G06F 13/28* (2006.01)
- *G06F 3/06* (2006.01)

(52) U.S. Cl.
USPC ................................. 713/194; 711/4; 711/164

(58) Field of Classification Search ................. 713/193, 713/194; 711/4, 101, 162–164
See application file for complete search history.

(56) References Cited

U.S. PATENT DOCUMENTS

| | | | |
|---|---|---|---|
| 5,883,864 A * | 3/1999 | Saliba | 360/92.1 |
| 6,097,566 A * | 8/2000 | Heller et al. | 360/92.1 |
| 7,206,942 B2 | 4/2007 | Abe | |
| 7,818,587 B2 * | 10/2010 | Drew et al. | 713/193 |
| 2004/0101140 A1 | 5/2004 | Abe | |
| 2004/0103292 A1 | 5/2004 | Shirouzu | |
| 2004/0254678 A1 * | 12/2004 | Hellman et al. | 700/245 |
| 2005/0071591 A1 * | 3/2005 | Goodman et al. | 711/163 |
| 2007/0016742 A1 * | 1/2007 | Goodman et al. | 711/163 |
| 2007/0028112 A1 * | 2/2007 | Mackelden et al. | 713/176 |

(Continued)

FOREIGN PATENT DOCUMENTS

| | | |
|---|---|---|
| JP | 2003-337753 | 11/2003 |
| JP | 2004-88453 | 3/2004 |
| JP | 2004-178639 | 6/2004 |
| WO | WO 2006/098009 | 9/2006 |

OTHER PUBLICATIONS (Japanese Patent Laid-Open No. 2004-88453) corresponds to Reference AA (U.S. Patent Publication No. 2004/0103292).
(Japanese Patent Laid-Open No. 2004-178639) corresponds to Reference AB (U.S. Patent Publication No. 2004/0101140) and Reference AC (U.S. Patent No. 7,206,942).

(Continued)

*Primary Examiner* — Christian Laforgia
(74) *Attorney, Agent, or Firm* — Staas & Halsey LLP

(57) ABSTRACT

A key data recording device includes a key data recording medium section which stores key data of the encrypted data; and a reading/writing section which reads and writes the key data from and into the key data recording medium section, which sections are contained in a cartridge casing accommodatable in a library unit. When the cartridge casing is irregularly ejected from the library unit, the key data recorded in the key data recording medium section is deleted. This configuration can enhance the confidentiality of encrypted data because the key data is not leaked even when the recording medium in which key data of the encrypted data is recorded is carried away.

7 Claims, 21 Drawing Sheets

U.S. PATENT DOCUMENTS

2007/0083759 A1* 4/2007 Drew et al. ............ 713/168
2008/0010396 A1 1/2008 Itou et al.
2008/0055773 A1* 3/2008 Nigam ............ 360/99.01
2008/0294857 A1* 11/2008 Grimes et al. ............ 711/161
2010/0195242 A1* 8/2010 Wideman ............ 360/71

OTHER PUBLICATIONS

Japanese Patent of Notice of Grounds of Rejection mailed Apr. 12, 2011 for corresponding Japanese Patent Application No. 2009-160431.

* cited by examiner

APPARATUS AND METHOD FOR STORING KEY DATA, LIBRARY UNIT, AND STORAGE DEVICE

CROSS-REFERENCE TO RELATED APPLICATIONS

This application is based upon and claims the benefit of priority of the prior Japanese Patent Application No. 2009-160431, filed on Jul. 7, 2009, the entire contents of which are incorporated herein by reference.

FIELD

The embodiment discussed herein is a technique of maintaining confidentiality of data recorded in a portable storage media such as a magnetic tape cartridge, and more particularly is a technique of preventing key data of encrypted data from being leaked.

BACKGROUND

As an external storage device that backs up data of a large computer system, a library unit including a large number of magnetic tape cartridges has been widely known to the art. In the library unit, a magnetic tape cartridge held in a magazine is gripped out of the magazine by a robot arm and transferred to a drive, where data is recorded and reproduced into the cartridge. However, since, in the library unit, the magnetic tape cartridge can be easily taken out of the magazine, data leaking due to stealing and such of the magnetic tape cartridge is concerned, strict security management on data stored in the magnetic cartridge has been in demand.

In general, encryption of data to be recorded is known as one of techniques for data security management. In this scheme, data is encrypted by a predetermined algorithm using a key data and the encrypted data is recorded in a recording medium; in reproducing the encrypted data recorded, the encrypted data is decrypted using the key data. With this configuration, recording encrypted data in a magnetic tape cartridge in a library unit can prevent the data from leaking unless the key data leaks even when the magnetic tape cartridge is stolen.

Conversely, the scheme of encrypting data to be recorded allows anyone who knows the key data to decrypt the data, so that the data confidentiality is unfortunately not ensured. Therefore, the key data is appropriately managed so as to be used only by those who have access right to the recording medium.

With the foregoing in view, there is proposed a technique in which key data of encrypted data is divided into a number of key data segments and the segments are stored in different recording media (see for example Patent Literature 1). According to this scheme, confidentiality of the encrypted data can be enhanced because the key data is not reproduced unless all the segments are read from respective recording media.

[Patent Literature 1] Japanese Patent Application Laid-Open (KOKAI) No. 2004-088453 (see pages 8 through 13, FIGS. 5 through 9)

However, even the above technique of dividing key data of encrypted data into a number of segments permits reproduction of the key data when a third party steals all the recording media storing all the segments. Success in reproducing the key data from the segments even allows the third party to decrypt the encrypted data, leading to a failure to ensure sufficient security of data is not sufficiently ensured.

For example, in the event of transferring a recording medium storing encrypted data among a number of data centers remote from one another, the key data needs to be transferred in conjunction with the recording medium. There is a possibility of the key data leaking during the transfer.

SUMMARY

An apparatus for storing key data of encrypted data of the embodiment includes: a cartridge casing accommodatable in a library unit; a key data recording medium section which is contained in the cartridge casing and which stores the key data of the encrypted data; a reading/writing section which is contained in the cartridge casing and which reads and writes the key data from and into the key data recording medium section, wherein when the cartridge casing is irregularly ejected from the library unit, the key data recording medium section deletes the key data.

A library unit capable of accommodating a cartridge storing device which stores encrypted data of the embodiment includes: a storage space which accommodates the cartridge storing device and a key data recording device; a recording/reproducing device which stores and reproduces the encrypted data into the cartridge storing device; and a transferring device which includes a gripper and which transfers the cartridge storing device between the storage space and the recording/reproducing device while the gripper grips the cartridge storing device, wherein the key data recording device accommodatable in the storage space includes a key data recording medium section which stores key data of the encrypted data and which deletes the key data stored therein when power supply to the key data recording medium section is stopped, a reading/writing section which reads and writes the key data from and into the key data recording medium section, a power supplying terminal which supplies power from a power supplying section disposed in the library unit to the key data recording medium section, and a cartridge casing which is accommodatable in the storage space and which contains the key data recording medium section, the reading/writing section and the power supplying terminal, and the gripper includes a power supplying section which supplies power to the power supplying terminal of the key data recording device being gripped by the gripper.

A method for managing key data of the embodiment includes: storing key data of encrypted data recorded in cartridge storing device accommodated in a storage space of a library unit into a recording medium which deletes data stored therein when power supply to the recording medium is stopped; accommodating the recording medium into the storage space and supplying power from a first power supplying section disposed at the storage space to the recording medium to retain the key data; and permitting, when a transferring device of the library unit ejects the recording medium from the storage space after verification with a certificated key previously prepared succeeds, power supply to the recording medium from a power supplying section of the transferring device.

A portable storage device of the embodiment which is carried and accommodatable in a library unit in a state of accommodating one or more data recording devices, wherein: each of the data recording devices includes: a cartridge casing, a data recording medium section which is contained in the cartridge casing, which stores data, and which deletes the stored data when power supply to the data recording medium section is stopped, and a reading/writing section which is contained in the cartridge casing and which reads and writes the data from and into the data recording medium section; and the portable storage device further includes a storage shelf capable of accommodating the data recording devices, a battery, and a power supplying section which is disposed at the storage shelf and which supplies power from the battery to the reading/writing section of each of the data recording devices accommodated in the storage shelf.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

DESCRIPTION OF EMBODIMENT(S)

Description will now be made in relation to a key data recording device and a library unit of a first embodiment with reference to accompanying drawings.

(Overview)

Firstly, description will now be made in relation to overview of the library unit and the key data recording device according to the first embodiment.

In general, a library unit serves as an external storage unit that backs up data of a large-scale computer system, and accommodates a large number of cartridge storing devices (hereinafter also called portable storage media). Examples of a portable storage medium are a magnetic tape cartridge, a flexible disc, an optical disc, and a reeled magnetic tape. Here, a portable storage media is assumed to be a magnetic tape cartridge using a magnetic tape as a recording medium. Hereinafter, a magnetic tape cartridge is also called a tape cartridge.

The library unit encrypts data to be recorded in a tape cartridge and records the encrypted data, and stores key data (hereinafter also called encryption key) of the encrypted data into a memory of a cartridge storing device. Consequently, when one wishes to read data stored in the tape cartridge, he or she needs to obtain the encryption key of the encrypted data stored in the tape cartridge and to decrypt the encrypted data in the tape cartridge, involving the enhancement in security.

However, the encryption key must not be leaked. For this reason, the encryption key is stored in a volatile recording medium (hereinafter also called volatile memory) in a cartridge recording device similar to the cartridge storing devices, and, in the event of the cartridge recording device being carried away in an unauthorized manner, power supply to the volatile memory is set to stop. Also when the cartridge recording device is removed from a predetermined place, power supply to the volatile memory is continued if verification with a certificated key succeeds in an attempt of avoiding cases where a third party intends to obtain in an unauthorized manner the encryption key considering as far as power supply to the volatile memory. Namely, unless the certificated key is verified, power supply to the volatile memory is prepared to stop.

(Key Data Recording Device)

Figure 1:
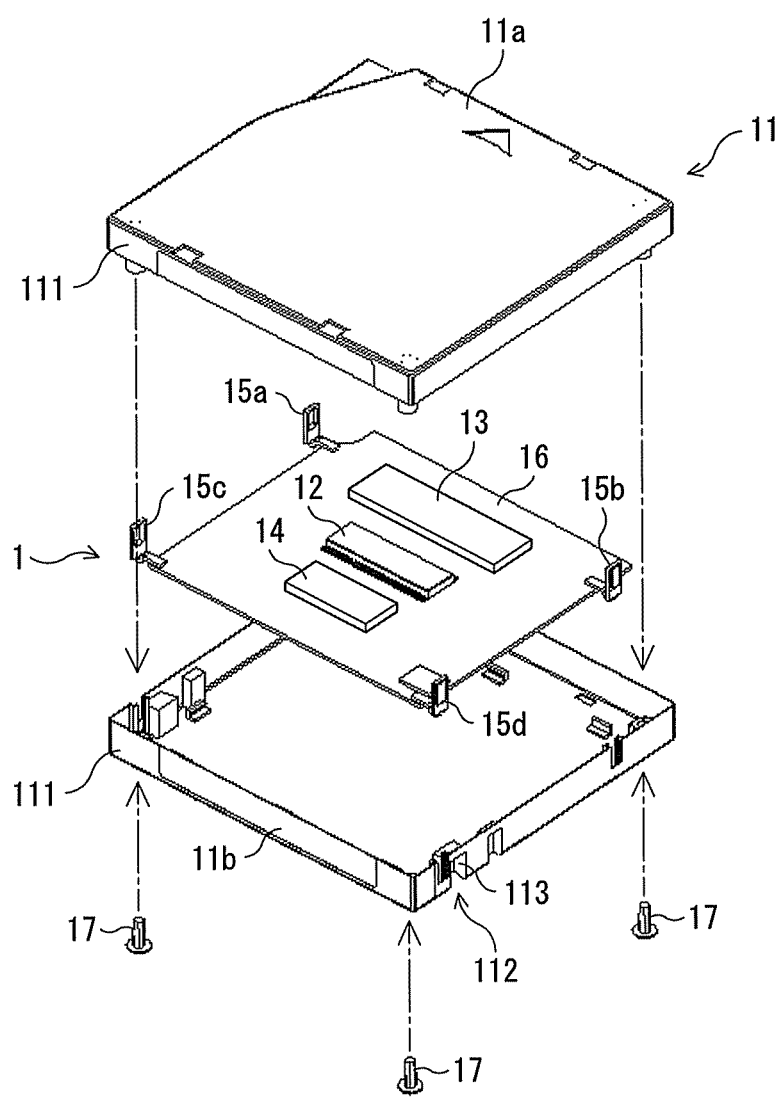
FIG. 1 is an exploded perspective view of an example of a key data recording device according to a first embodiment.

Next, a key data recording device will now be described. As illustrated in FIG. 1, the key data recording device 1 includes a volatile recording medium 12 serving as a key data recording medium section, a non-contact-type IC tag 13 serving as a reading/writing section, and a switch 14 serving as an unauthorized access prohibiting section, which are contained in the casing (cartridge casing) 11. Furthermore, the key data recording device 1 includes power supplying terminals 15a through 15d each of which supplies power to the volatile memory. The key data recording device is hereinafter also called a cartridge memory because of its shape, and the volatile recording medium 12 is also hereinafter called the volatile memory (RAM, or simply memory).

The casing 11 has two parts of a first casing part 11a and a second casing part 11b which interpose a board 16, which fit to each other, and which are fastened at the four corners with bolts 17, so that key data recording device 1 is formed. On the board 16, the volatile memory 12 and the switch 14 are disposed. Fastening the casing parts 11a and 11b together causes the volatile memory 12, the IC tag 13, and the switch 14 to be contained in the casing 11. The power supplying terminals 15a through 15d are fixed to the edge of the board 16, and appear at predetermined positions after the casing parts 11a and 11b are fastened together.

On the board 16, non-illustrated wiring is printed. The board 16 forms circuit schematically illustrated in FIG. 2 in the cartridge memory 1. In other words, the volatile memory 12 is coupled to the power supplying terminal 15a through a power supplying line 16b and is also coupled to the power supplying terminal 15c through a power supplying line 16c. The power supplying terminal 15a is configured to be supplied with power from respective power supplying sections disposed at a library unit and a magazine to be detailed below. The power supplying terminal 15c is configured to be supplied with power from a power supplying section disposed at the hand of a robot serving as a gripper of a transferring device to be detailed below. The power supplying terminal 15b coupled to the library unit and the magazine and the power supplying terminal 15d coupled to the hand are grounded. The power supplying terminals 15a and 15b that are supplied with power from the power supplying sections of the library unit and a magazine is referred to as first power supplying terminals; and the power supplying terminal that are supplied with power from the power supplying section of the robot are referred to as second power supplying terminals.

The IC tag 13 includes a CPU 13a serving as a controller, an ROM (nonvolatile memory) 13b serving as a recording section, an EEPROM (electrically erasable, programmable ROM) 13c, a receiver 13d, and a transmitter 13e which are contained in an IC chip. The CPU 13a, the ROM 13b, the EEPROM 13c, the receiver 13d, and the transmitter 13e are coupled to a communication circuit 16a. The IC tag 13 further includes an antenna (coil) 13f that establishes non-contact communication with an external unit, and a regulator 13g. The receiver 13d receives a signal input through the antenna 13f and the transmitter 13e creates a signal to be output through the antenna 13f. The regulator 13g rectifies alternating voltage generated by electromagnetic induction on the radio wave input into the antenna 13f into direct voltage and supplies the direct voltage to the respective power consumption elements 13a through 13e. The communication circuit 16a of the IC tag 13 is coupled to the volatile memory 12. A typical IC card functions the same as the IC tag 13, so an IC card is also regarded as the IC tag 13, here.

The switch 14 is exemplified by a field-effect transistor (FET) and is disposed on the power supplying line 16c interposed between volatile memory 12 and the power supplying terminal 15c, which is coupled to a power supplying section disposed at the gripper (hand) of the transferring device (robot). The switch 14 is activated in response to a certificated key signal from the robot at start of power supply to the switch 14 from the robot. Upon receipt of a certificated key signal previously prepared, the switch 14 closes (turns on) the power supplying line 16c and thereby starts the power supply to the volatile memory 12. In the meantime, if the switch 14 does not receive the certificated key signal previously prepared, the switch 14 forcibly opens (turns off) the power supplying line 16c and thereby stops the power supply to the volatile memory 12. A stop of power supply to the volatile memory 12 causes the data stored in the volatile memory 12 to volatile, that is, to be deleted.

Accordingly, when verification with the certificated key signal previously prepared does not normally succeed, the cartridge memory 1 judges that the power supply is an invalid access, that is, an irregular ejection, and consequently deletes the key data stored in the volatile memory 12.

Figure 2:
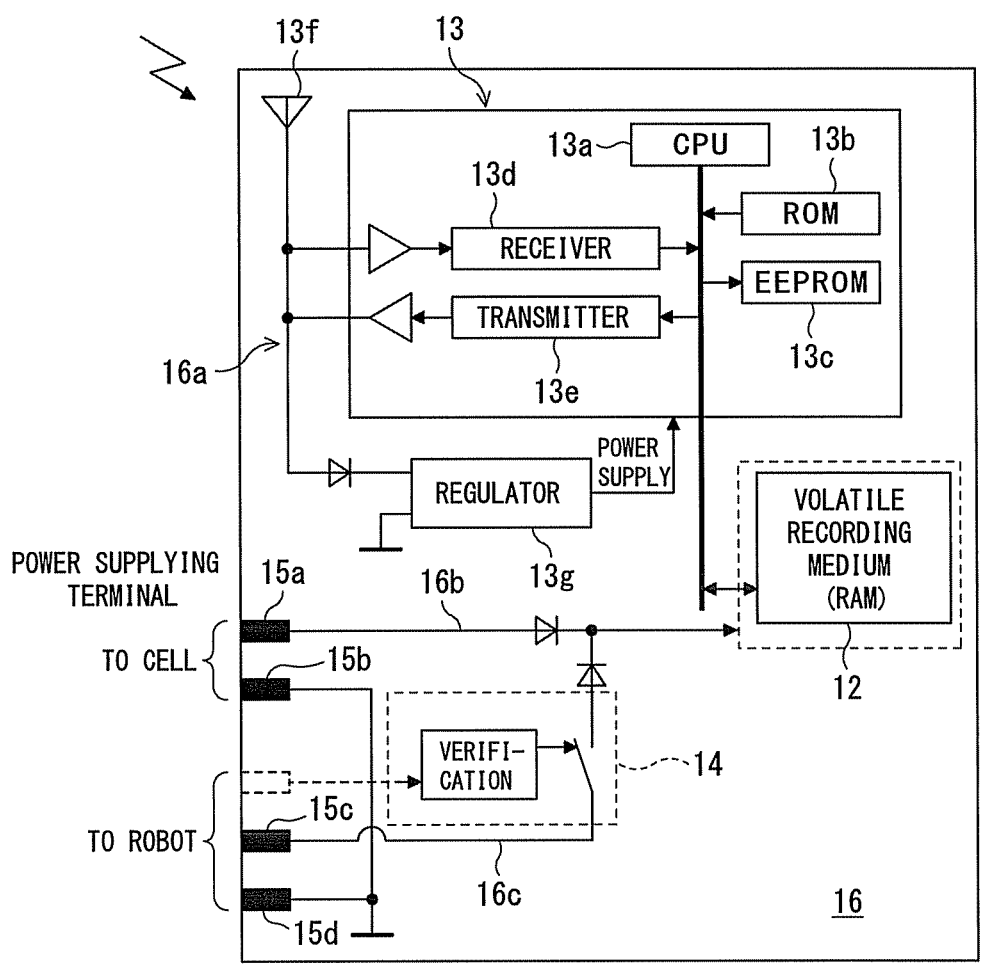
FIG. 2 is a block diagram schematically illustrating a key data recording device according to the first embodiment.

In FIG. 2, the terminal and the transmission line for transmitting a certificated key signal of the hand to the switch 14 are expressed by broken lines. Alternatively, the terminal and the transmission line may be omitted by the use of bus standard that transfers data only through a grounding line and a single signal line (also serving as power supplying line), so that the configuration of the cartridge memory 1 can be further simplified.

Figure 3:
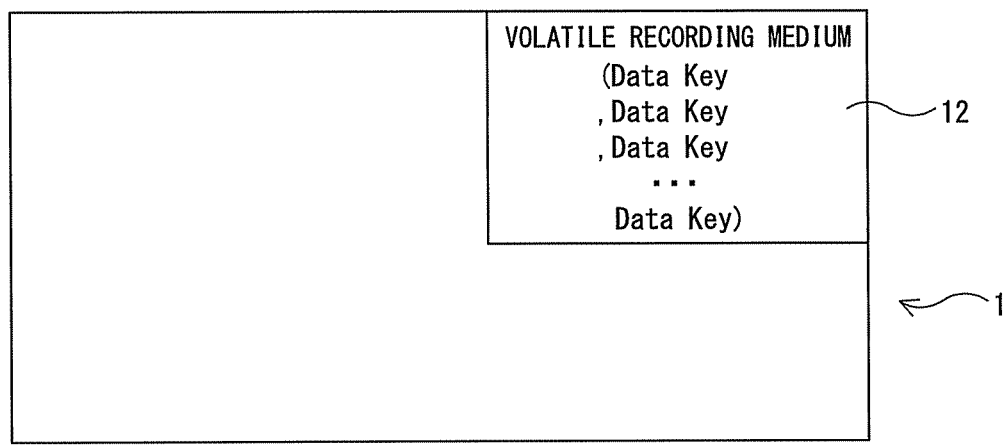
FIG. 3 is a diagram illustrating information stored in a volatile recording medium of the key data recording device of the first embodiment.
Figure 4:
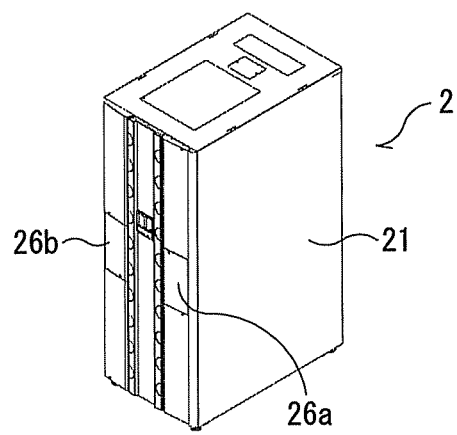
FIG. 4 is a perspective view illustrating a library unit of the first embodiment which accommodates a magazine according to the first embodiment.

The casing 11 of the cartridge memory 1 has the same standard as that of a cartridge casing of a tape cartridge to be accommodated in the library unit 2. In other words, the casing 11 is the same in size, shape, and function as the cartridge casing of tape cartridge. For this reason, the casing 11 of the cartridge memory 1 is configured to be accommodatable in a storage shelf of the library unit 2. The cartridge memory 1 is accommodated in a predetermined storage shelf in the library unit 2 as detailed below, and key data (encryption key) of encrypted data recorded in the tape cartridge is stored in the volatile memory 12 as illustrated in FIG. 3.

A key data deleting section is formed of the first power supplying terminals 15a and 15b, the second power supplying terminals 15c and 15d, and the switch 14. Namely, the first power supplying terminals 15a and 15b are disposed in such positions that the terminals 15a and 15b supply power to the volatile memory 12 while the cartridge memory 1 is stored in the storage shelf and stop power supply to the volatile memory 12 upon ejection of the cartridge memory 1 from the storage shelf. Accordingly, the first power supplying terminals 15a and 15b function as the key data deleting section that deletes data stored in the volatile memory 12 when the cartridge memory 1 (the casing 11) is taken out of the storage shelf of the library unit 2.

Figure 7:
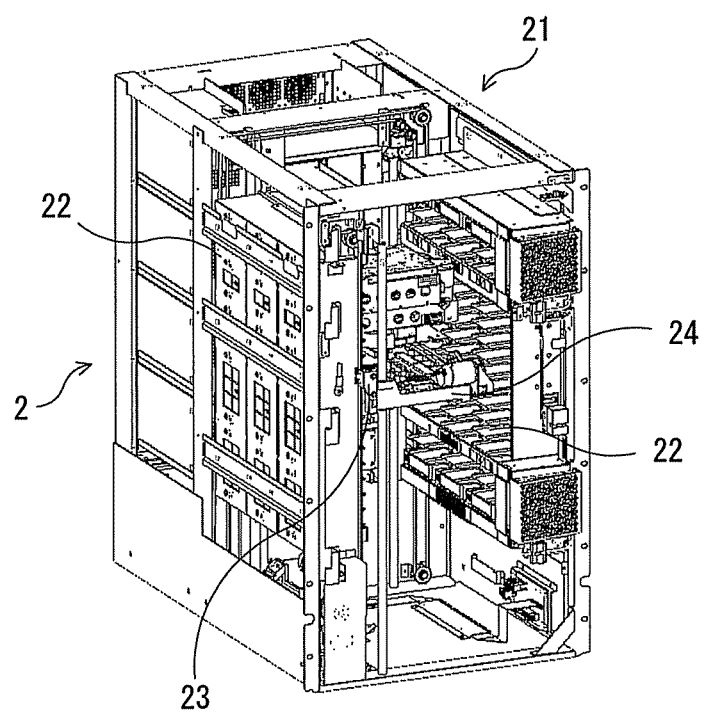
FIG. 7 is a perspective view illustrating the library unit of the first embodiment opening all the covers thereof.
Figure 8:
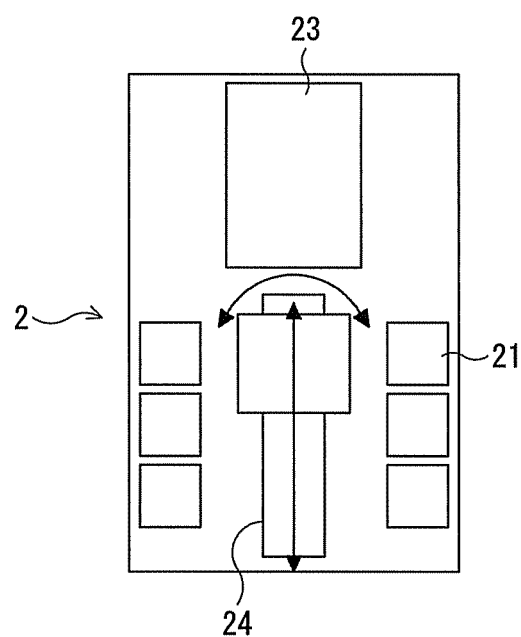
FIG. 8 is a top view schematically illustrating the arrangement of elements of the library unit of the first embodiment.

The switch 14 closes (turns on) the circuit when the cartridge memory 1 is properly gripped by a robot 24 (see FIGS. 7 through 9) so that the second power supplying terminals 15c and 15d supply power to the volatile memory 12. However, when the cartridge memory 1 is improperly grasped by an article except for the robot 24, the switch 14 opens (turns off) the circuit so that the power supply from the second power supplying terminals 15c and 15d to the volatile memory 12 stops. Accordingly, the switch 14 and the second power supplying terminals 15c and 15d function as a key data deleting section that deletes data stored in the volatile memory 12 immediately after the cartridge memory 1 (the casing 11) is taken out of the storage shelf of the library unit 2.

(Library Unit)

Here, the library unit will now be described with reference to FIGS. 4 through 9.

As illustrated in FIGS. 4 through 8, the library unit 2 includes, in a casing 21, a number of storage shelves (hereinafter also called cells) 22 serving as a storage space which accommodates a number of tape cartridges (simply called media) 3 (see FIGS. 11 and 15) that function as cartridge storing devices storing data. The casing 21 contains recording/reproducing devices (hereinafter also called drives) 23 which read and write data from and into the tape cartridges 3, and a robot 24 serving as a transferring device which transfers the tape cartridges 3 between the cells and the drives 23.

Figure 9:
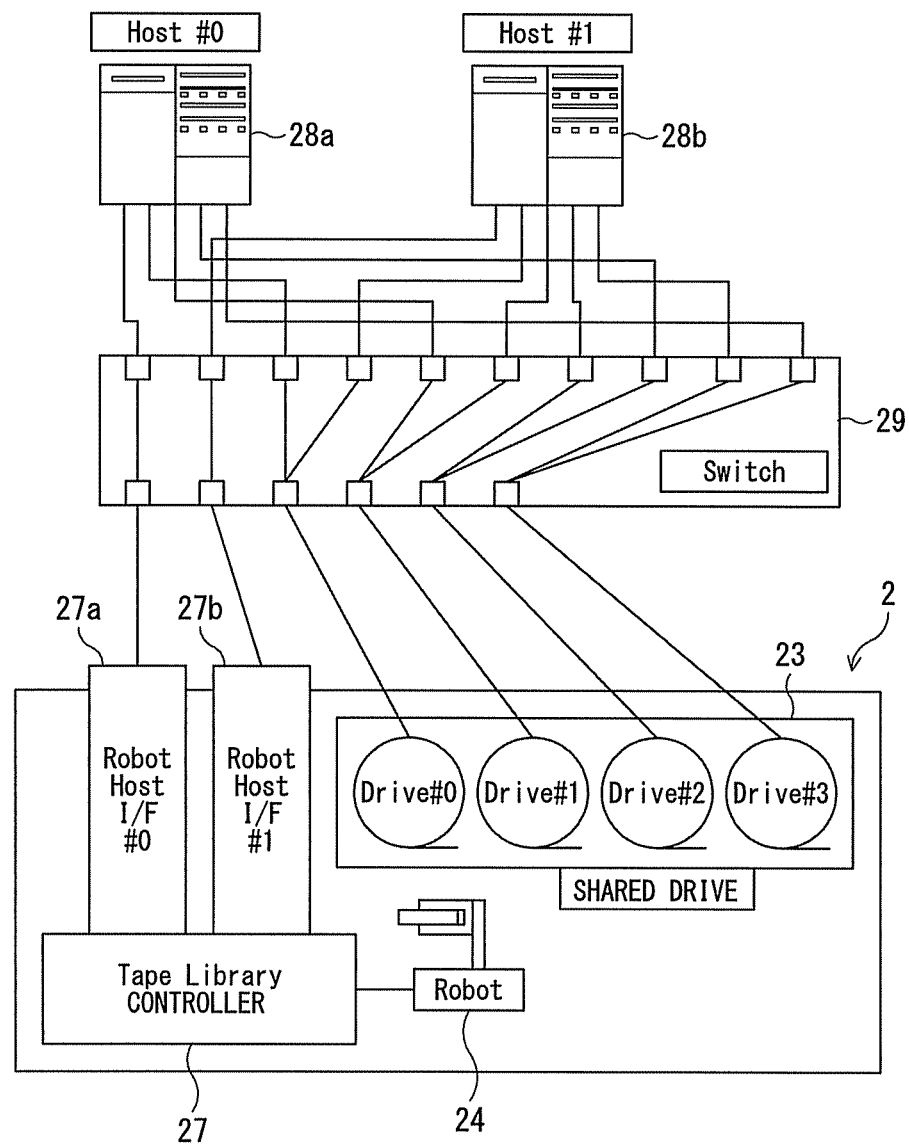
FIG. 9 is a diagram illustrating the hardware configuration of the library unit of the first embodiment.

Referring to FIG. 9, the library unit 2 includes a controller 27 coupled to one or more external host computers (in the illustrated example, two host computers 28a and 28b) via interfaces 27a and 27b. The interfaces 27a and 27b and each drive 23 of the library unit 2 are coupled to host computers 28a and 28b through a switching device 29. With this configuration, either host computer 28a or 28b operates the robot 24 and each drive 23, so that a needed tape cartridge 3 is transferred to an appropriate drive 23 and data can be read from and rewritten into the tape cartridge. The host computers are represented by reference number 28 if the computers need not to be discriminated from one another.

Figure 5:
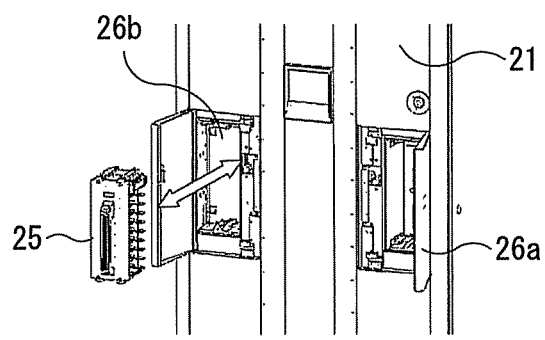
FIG. 5 is a perspective view illustrating the main part of the access section that loads and ejects a magazine into and from the library unit of the first embodiment.
Figure 6:
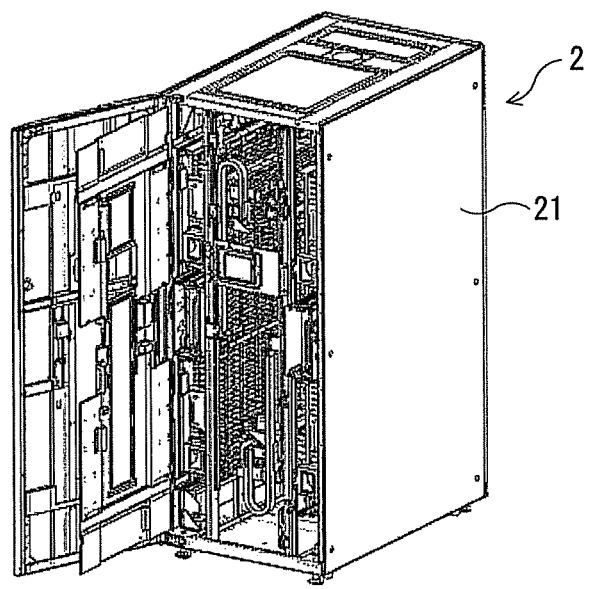
FIG. 6 is a perspective view illustrating the library unit of the first embodiment opening one of the covers thereof.

The library unit 2 further includes a magazine mechanism which inserts and ejects the tape cartridges 3 into and from the library unit. As illustrated in FIG. 5, the magazine mechanism includes a magazine (portable storage device) 25 that accommodates a number of tape cartridges 3, and cartridge loading/ejecting mechanism (CAS: Cartridge Access Station) 26a and 26b disposed on one face of the casing 21. The tape cartridges 3 are accommodated in storage shelves (hereinafter called cells) 25a (see FIG. 15) which are disposed in the magazine 25 and which has the same structure as that of the cells 22. Each of the tape cartridges 3 is stored in the casing 21 by inserting the magazine 25 into the inserting CAS 26a and are ejected from the casing 21 by ejecting the magazine 25 through the ejecting CAS 26b.

The robot 24 includes an arm 241 serving as a gripper. The arm 241 grips a tape cartridge 3 and transfers the tape cartridge 3 between the cell 22 accommodating the same cartridge 3 and the drive 23. The robot 24 transfers the tape cartridges 3 in the inserted magazine 25 to proper cells 22 to be stored in the cells 22.

Needless to say, the tape cartridges 3 are each formed by storing a tape, such as a recording medium, in the cartridge casing 31 manufactured under the same standard (i.e., having the constant shape and size). The cells 22 and the cells 25a of the magazine 25 have a space shape conforming to the standard of the cartridge casing 31.

As described above, the casing 11 of the cartridge memory 1 has the same standard as that of a cartridge casing 31 of a tape cartridge 3. Therefore, similarly to the tape cartridges 3, the cartridge memory 1 is accommodatable in the cells 22 and the cells 25a in the magazine 25 and can be gripped by the arm 241 of the robot 24.

Figure 10:
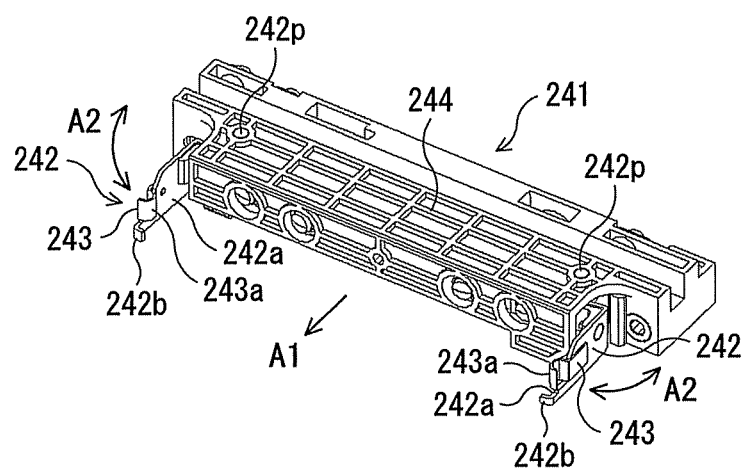
FIG. 10 is a perspective view illustrating a gripper which has a power supplying section and transmitting/receiving section which are disposed in a transferring device of the library unit of the first embodiment.

Here, the arm 241 of the robot 24 will now be detailed. As illustrated in FIG. 10, the arm 241 includes symmetrical pickers 242 and 242. Additionally in this embodiment, the arm 241 includes, in proximity to the picker 242, a reader/writer 244 which creates an encryption key and information about encryption and decryption and which reads and writes the encryption key from and into the cartridge memory 1.

The pickers 242 are each rotated around the pivot 242p in the direction of arrow A2 of FIG. 10 by a non-illustrated actuator, and thereby grip the both side faces of the casing 11 of the cartridge memory 1. Specifically, the arm 241 is moved to a predetermined position in vicinity to an edge 311 or 111 of the casing 31 or 11 as arrow A1 in FIG. 10 illustrates; the pickers 242 and 242 are rotated such that the edges of both pickers 242 and 242 approach each other and thereby grip both side faces 312 or 112 of the casing 31 or 11.

Figure 11:
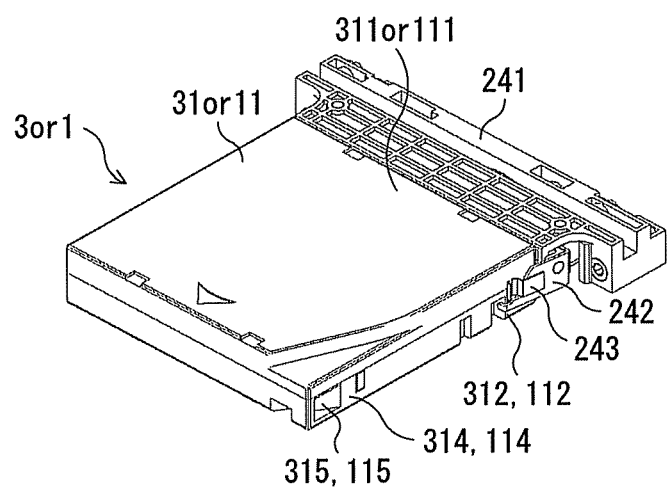
FIG. 11 is a perspective view illustrating the key data recording device being gripped by the gripper of the transferring device according to the first embodiment.

In particular, gripping faces 242a of respective pickers 242 include lugs 242b and 242b which project so as to approach each other. Recesses 313 or 113 into which the lugs 242b and 242b are inserted are formed on both side faces 312 or 122 of the casing 31 or 11. The insertion of the lugs 242b and 242b into the recesses 313 or 113 causes the pickers 242 and 242 to grip the casing 31 or 11 in a proper posture, as illustrated in FIG. 11.

Each picker 242 includes a power supplying piece (second power supplying section) 243 which is made of a highly-conductive copper plate, which is coupled to a non-illustrated power source, and which includes a protrusion 243a projecting from the gripping face 242a. The casing 11 of the cartridge memory 1 includes the power supplying terminals 15c and 15d which conform to the arm 241 of the robot 24.

Figure 12:
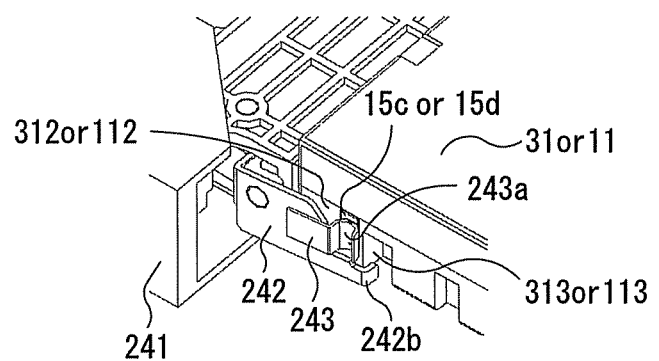
FIG. 12 is a perspective view illustrating connection between the power supplying section of the transferring device and the power supplying terminal of the key data recording device according to the first embodiment.
Figure 13:
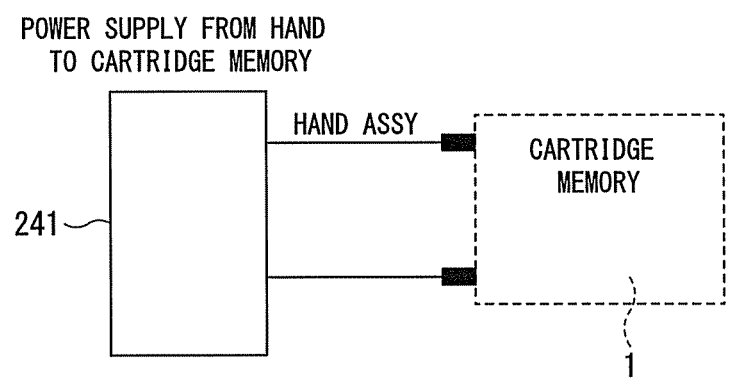
FIG. 13 is a block diagram illustrating power supply from the transferring device to the key data recording device according to the first embodiment.

As illustrated in FIG. 12, the pickers 242 and 242 grip the first ends 112 and 112 on the both sides of the cartridge memory 1, and the protrusions 243a of the power supplying pieces 243 come into contact with the power supplying terminal 15c and 15d. With this configuration, power from the power source of the library unit 2 is supplied through the power supplying pieces 243 and then the power supplying terminal 15c to the volatile memory 12 of the cartridge memory 1, as illustrated in FIG. 13.

Figure 14:
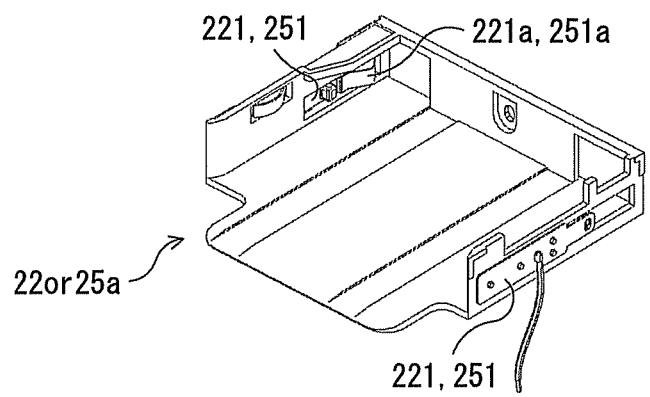
FIG. 14 is a perspective view illustrating a power supplying section disposed at a storing shelf included in the library unit of the first embodiment.

In the meantime, power supplying pieces 221 and 225 which respectively have protrusion 221a and 251a and which are coupled to a power source are disposed so as to face each other on the inner wall of each cell 22 or in one or more particular cells 22, and also on the inner wall of each cell 25a or one or more particular cell 25a of the magazine 25 as illustrated in FIG. 14. The power supplying piece 221 corresponds to the first power supplying section and the power supplying piece 251 corresponds to the third power supplying section. When the case 11 is stored in the cell 22 or 25a in a predetermined posture, the protrusions 221a and 251a of the power supplying pieces 221 and 251 come into contact with the power supplying terminals 15a and 15b (see FIG. 2) in recesses 115 (see FIG. 11) disposed at second ends 114 and 114 on the both sides of the casing 11.

The power supplying terminal 15a and 15b are disposed on the casing 11 of the cartridge memory 1, as described above, and the protrusions 221a and 251a of the power supplying pieces 221 and 251 of the cells 22 and 25a contact with the power supplying terminals 15a and 15b. Thereby, the power from the power source of the library unit 2 or from the power source of the magazine 25 is supplied through the power supplying pieces 221 and 251 and further power supplying terminal 15a to the volatile memory 12 of the cartridge memory 1.

Figure 15:
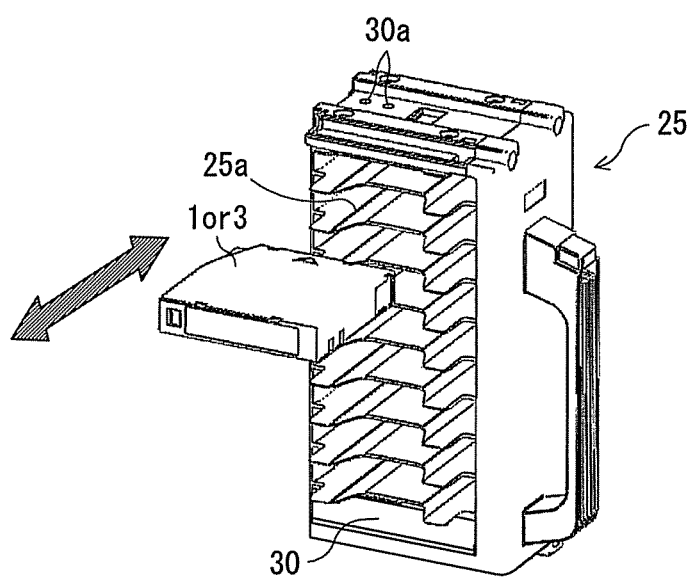
FIG. 15 is a perspective view illustrating a first example of a magazine having a power supply system according to the first embodiment.

Referring to FIG. 15, the magazine 25 includes a battery 30 disposed inside thereof and charging terminal 30a which charges the battery 30 and which is disposed on the surface of the casing thereof. Setting the magazine 25 in the library unit 2 causes the charging terminal 30a to couple to the power source (not illustrated) of the library unit 2 through a connector (not illustrated) disposed at the CAS 26a, so that the battery 30 is always charged with power from the power source of the library unit 2. Namely, the connector disposed at the CAS 26a functions as a fourth power supplying section which supplies the charging terminal 30a with power.

Figure 16:
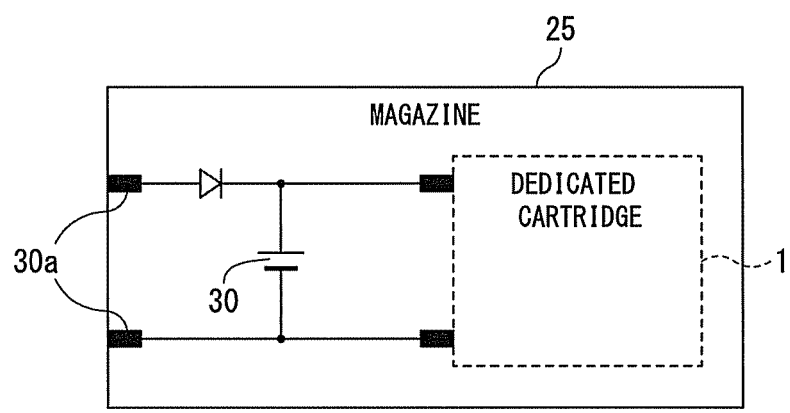
FIG. 16 is a block diagram schematically illustrating the power supplying system of a magazine to be accommodated in the library unit of the first embodiment.

As a consequence, the battery 30 is always charged with power and, even when the magazine 25 is ejected from the library unit 2 for transfer, the volatile memory 12 of the cartridge memory 1 is supplied with power as illustrated in FIG. 16 and therefore data stored in the volatile memory 12 is not deleted.

Figure 17:
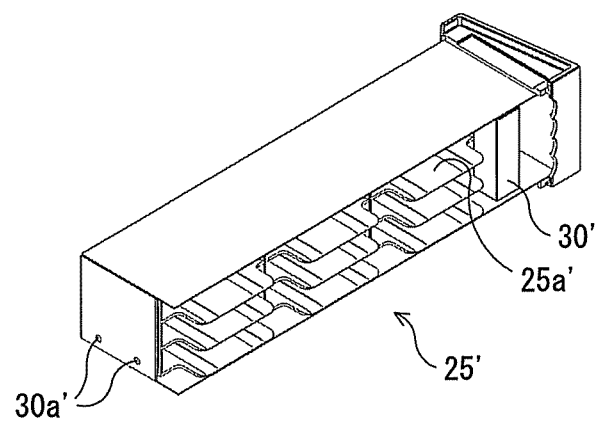
FIG. 17 is a perspective view illustrating a second example of a magazine having a power supply system according to the first embodiment.

The magazine 25 may take an alternative form as illustrated in FIG. 17. The magazine 25' of FIG. 17 also includes a battery 30' and a charging terminal 30a' which charges the battery 30' with power. The battery 30' is always charged with power and supplies power to the volatile memory 12 of the cartridge memory 1 accommodated in the cell 25a'.

The library unit 2 needs to carry out processing of storing an encryption key in the volatile memory 12 of the cartridge memory 1, and processing of obtaining the store encryption key from the cartridge memory 1. In the present embodiment, the reader/writer 244 disposed at the hand 241 of the robot 24 carries out the processing of storing the encryption key to the volatile memory 12 and the processing of obtaining the encryption key from the volatile memory 12. However, it is sufficient that the robot 24 merely inputs the encryption key from the volatile memory 12, and storing of the encryption key into the volatile memory 12 may be carried out by another device.

In this embodiment, the encryption key is transferred between the robot 24 and the volatile memory 12 after the hand 241 of the robot 24 ejects the cartridge memory 1 from the cell 22.

Figure 18:
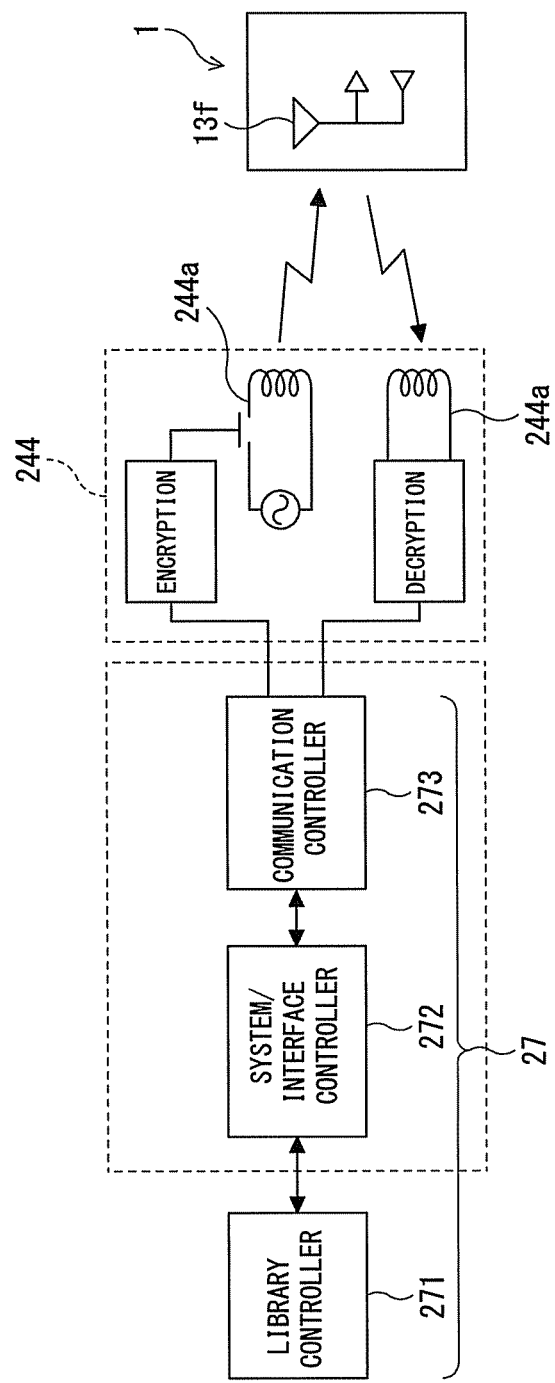
FIG. 18 is a block diagram schematically illustrating signal transmitting and receiving between a transmitting/receiving section of the transferring device and a reading section (IC tag) of the key data recording device according to the first embodiment.

As illustrated in FIG. 18, along with the encryption key information, encryption information of data to be recorded into a designated tape cartridge 3 with the encryption key information is input into the reader/writer 244 by the controller 27 of the library unit 2. Specifically, the information is input into the reader/writer 244 from a library controlling system 271 of the controller 27 through a system interface controller 272 and a communication controller 273 in the controller 27. The reader/writer 244 transmits the input encryption key to the non-contact-type IC tag 13 of the cartridge memory 1 through an antenna 244a and the antenna 13f. In the non-contact type IC tag 13, the CPU 13a writes the encryption key into the volatile memory 12 (see FIGS. 2 and 3).

In other words, the receiver 13d functions as a receiving section which receives an encryption key in the IC tag 13, and the CPU 13a functions as a controller which carries out processing of recording the encryption key into the volatile memory 12 and processing of reading the encryption key from the volatile memory 12. In addition, the transmitter 13e functions as a transmitting section which transmits the encryption key read by the CPU 13a.

In response to issuing of a signal requesting for the encryption key from the antenna 244a of the reader/writer 244, the non-contact-type IC tag 13 receives the signal through the antenna 13f and demands a certificated key signal of the robot 24. If the certificated key signal received from the robot 24 is (identical to) a predetermined signal previously input in the volatile memory 12, the encryption key stored in the volatile memory 12 is transmitted through the antenna 13f to the antenna 244a. The reader/writer 244 outputs the transmitted encryption key and decryption information to the library controlling system 271 through the communication controller 273 and the system interface controller 272.

When the certificated key signal from the robot 24 is not a predetermined signal, the switch 14 of the cartridge memory 1 is activated to forcibly turn off the power supplying line 16c so that power supply to the volatile memory 12 is stopped (see FIG. 2). Consequently, the data stored in the volatile memory 12 is deleted.

For example, when the cartridge memory 1 is transferred among a number of data centers remote from one another, the cartridge memory 1 is carried out, being accommodated in the magazine 25.

Even in a state where the magazine 25 or 25' is ejected from the library unit 2, the cartridge memory 1 accommodated in the magazine does not delete the data stored in the volatile memory 12 because the volatile memory 12 is supplied with power from the battery 30 or 30'.

During the transfer of the cartridge memory 1, when a third party and others ejects the cartridge memory 1 from the magazine 25 or 25', the power supply to the volatile memory 12 of the cartridge memory 1 stops and thereby data stored in the volatile memory 12 is deleted. Accordingly, it is possible to prevent key data from leaking during transfer of the cartridge memory 1, and confidentiality of data can be enhanced.

ADVANTAGES AND EFFECTS

The key data recording device (cartridge memory) 1 and the library unit 2 having the configurations described above carry out data recording in the following manner. The description assumes that data A is to be stored; a medium 3A is a tape cartridge into which data A is to be stored; and a drive 23A is a drive for the medium 3A.

Figure 19:
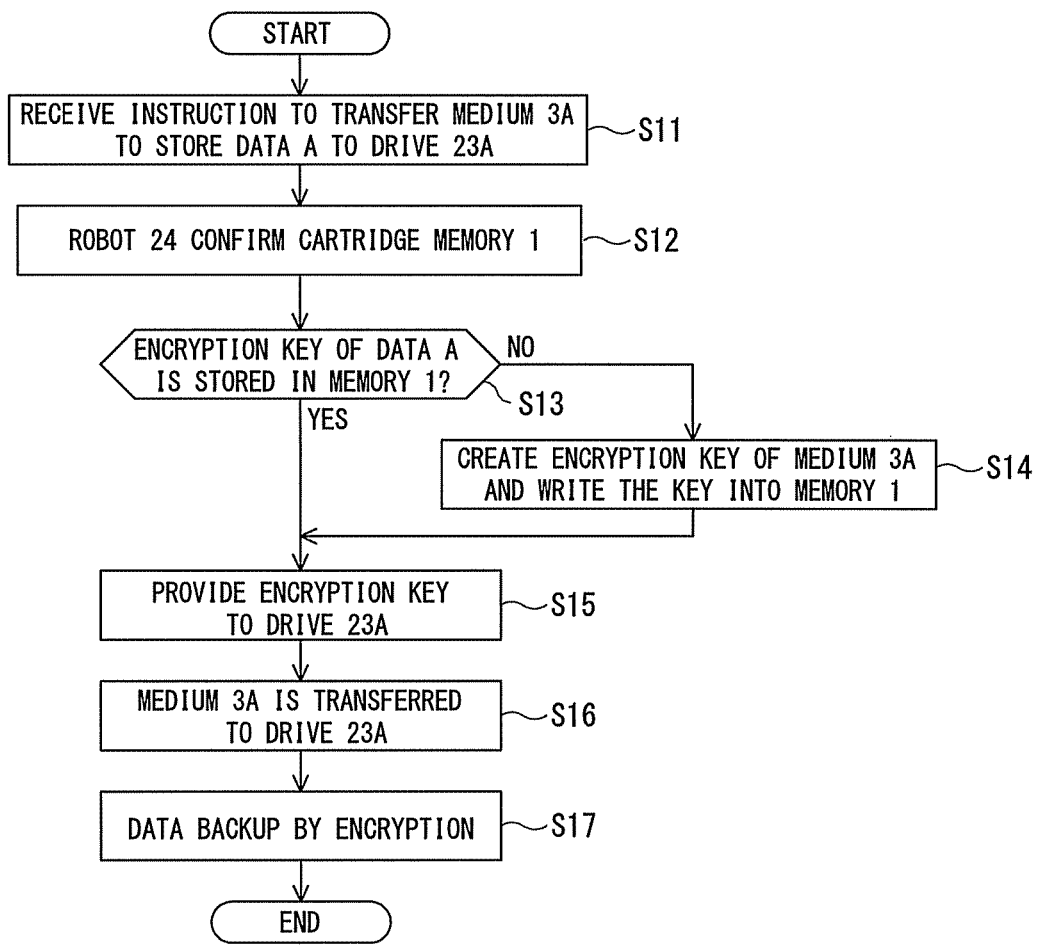
FIG. 19 is a flow diagram illustrating a succession of procedural steps of data encryption in a cartridge storing device in cooperation with the transferring device according to the first embodiment.

As illustrated in FIG. 19, upon receipt (step S11) of an instruction issued from an external host computer 28 to transfer the medium 3A into which data A is to be stored to the corresponding drive 23A in the library unit 2, the robot 24 confirms the cartridge memory 1 (step S12) to judge whether the encryption key of data A to be stored into the medium 3A is already recorded (step S13).

When the encryption key of data A is not recorded, the library unit 2 creates the encryption key and write the created encryption key into the volatile memory 12 of the cartridge memory 1 (step S14).

After that, the library unit 2 provides the encryption key to the drive 23A (step S15) and the robot 24 transfers the medium 3A to the drive 23A (step S16). The data A is encrypted and the encrypted data A is stored into the medium 3A (backup) (step S17). Then the robot 24 returns the medium 3A that stores the encrypted data A from the drive 23A to a predetermined cell 22A.

Due to this processing, even when the medium 3A is (irregularly) taken out by a third party, the data A (backup data) stored in the medium 3A is not decrypted unless he/she obtains the encryption key from the cartridge memory 1.

Figure 20:
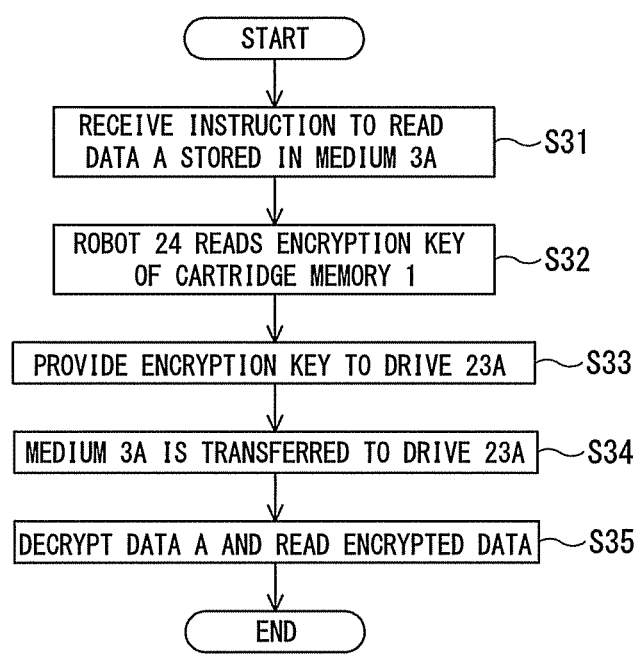
FIG. 20 is a flow diagram illustrating a succession of procedural steps of data decryption in a cartridge storing device in cooperation with the transferring device according to the first embodiment.

Conversely, as illustrated in FIG. 20, upon receipt (step S31) of an instruction from an external host computer to read data A, in the form of being encrypted form, stored in the medium 3A, the library unit 2 causes the robot 24 to read the encryption key recorded in the volatile memory 12 of the cartridge memory 1 (step S32). Specifically, the robot 24 takes the cartridge memory 1 out of the cell 22 through the use of the hand 241 and reads the encryption key recorded in the volatile memory 12 with the reader/writer 244.

The robot 24 provides the read encryption key to the drive 23A (step S33) and transfers the medium 3A to the drive 23A (step S34). Then the drive 23A decrypts the encrypted data A stored in the media 3A with the encryption key and reads the data A (step S35). After that, the robot 24 returns the medium 3A storing the data A in the form of being encrypted from the drive 23A to the predetermined cell 22A.

Acquisition of the encryption key of data A from the robot 24 requires the cartridge memory 1 to be removed from the cell 22 or cell 25a. That requires power supply system from the cell 22 or cell 25a to the volatile memory 12 of the cartridge memory 1 to be switched to power supply system from the robot. In normal cases, upon removal of the cartridge memory 1 from the cell 22 or the cell 25a, the power supply to the volatile memory 12 stops unless the power supply system from the robot is ensured.

However, in an attempt of prohibiting means equipped with a power supplying device other than the robot 24 from reading in an unauthorized manner the encryption key of data A, the switch 14 of the cartridge memory 1 carries out the following procedure.

Figure 21:
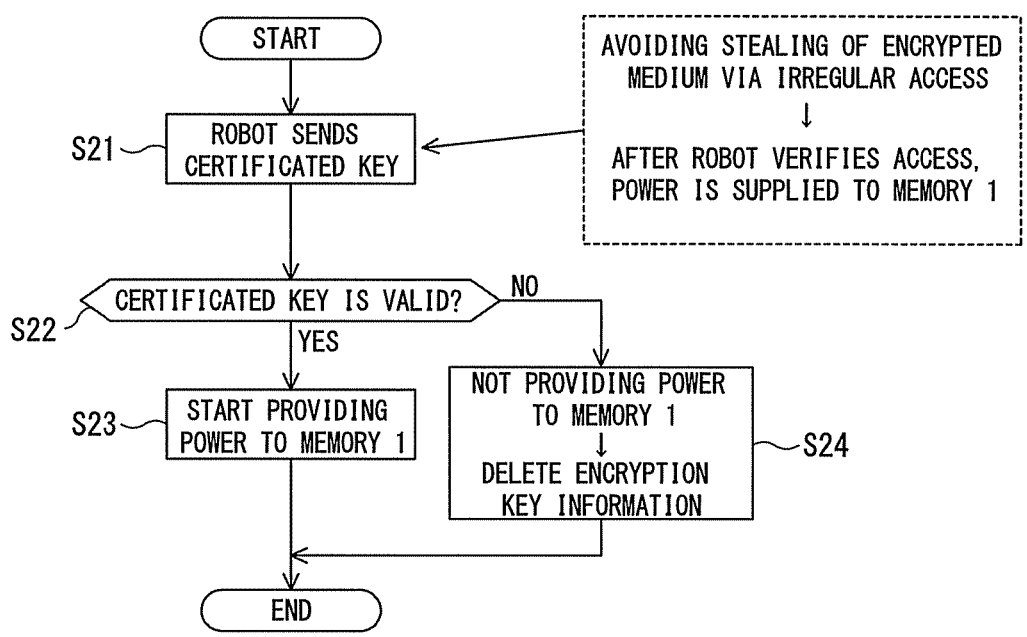
FIG. 21 is a flow diagram illustrating a succession of procedural steps of verification between the transferring device and the key data recording device according to the first embodiment.

In detail, when the power supplying terminal 15c of the cartridge memory 1 becomes ready to be supplied with power, the switch 14 of the cartridge memory 1 issues a request for a certificated key. In response to the request, the robot 24 transmits the certificated key to the cartridge memory 1 (step S21) as illustrated in FIG. 21. The switch 14 judges whether the received certificated key is valid (step S22). If the received certificated key is valid (regular access), power supply to the cartridge memory 1 is started (step S23). Conversely, if the received certificated key is judged to be invalid, the current access is concluded to be an irregular access and therefore power supply to the cartridge memory 1 is not provided (step S24).

Since the certificated key is previously installed in the robot 24, the certificated key received is judged to be valid so that power supply to the cartridge memory 1 is provided. Accordingly, even when the cartridge memory 1 is taken out from the cell 22 or 25a where the memory 1 has been accommodated, power supply to the volatile memory 12 of the cartridge memory 1 is continued by that from the robot 24 and the encryption key recorded in the volatile memory 12 is thereby maintained. In contrast, even when means equipped with a power supplying device intends to read the encrypted data in an unauthorized manner, the means is incapable of transmitting the valid certificated key. Consequently, when the unauthorized means takes out the cartridge memory 1 from the cell 22 or cell 25a, the ejection is judged to be an irregular operation, so that the power supply to the volatile memory 12 of the cartridge memory 1 stops to delete the encryption key recorded in the volatile memory 12, avoiding the encryption key from leaking.

Even incases where the medium 3A is carried away, the encryption key does not leak so that the data stored in the medium 3A cannot be read and confidentiality of the data can be greatly enhanced. In particular, the cartridge memory 1 is the same in shape and size as the tape cartridges 3 and can therefore be treated by the robot 24 in the same manner as the tape cartridges. In this embodiment, facilitation of managing the encryption key by the robot 24 is compatible with the enhancement in confidentiality of the data being stored.

(Others)

The above disclosure enables those ordinarily skilled in the art to carry out the embodiment.

Various changes and modifications can be suggested without departing from the concept of the embodiment detailed above.

For example, the first embodiment uses a volatile memory and adopts a simple configuration that an encryption key recorded in the volatile memory deletes when the power supply to the memory stops. Alternatively, the security of the encryption key may be guaranteed through the use of a memory of another type.

Specifically, the encryption key may be stored in the key data recording medium section 12, and when the casing 11 (i.e., the cartridge storing device 1) is taken out of the library unit 2, the encryption key may be deleted unless a predetermined condition is satisfied. An example of the predetermined condition is success in verification with the certificated key. This alternative allows the use of a memory other than a volatile memory as the key data recording medium section 12.

The first embodiment stops power supply to the volatile memory 12 from the second power supplying terminal 15c to delete the encryption key recorded in the volatile memory 12 on the condition of the completion of verification with the certificated key. The use of the certificated key for data confidentiality is not limited to the above manner. Alternatively, the certificated key may be used as a condition for transmission of the encryption key stored in the memory 12 from the IC tag 13. In other words, there may be adopted a logic that verification with the encryption key is carried out in response to a request for outputting the encryption key and that, when the verification does not succeed, the request for the encryption key is not accepted. In this alternative, even if a third party calls in an unauthorized manner the encryption key without taking out the cartridge memory 1 from the cell 22 or the cell 25a, the encryption key is not transmitted from the IC tag 13 unless he/she knows the certificated key. Accordingly, the data confidentiality can be further enhanced.

In the first embodiment, a magnetic tape cartridge is used as the cartridge storing device, which may be substituted by another portable storage medium, such as a flexible disk or an optical disk, as long as the medium is in the form of a cartridge.

In the technique disclosed above, the casing which contains the key data recording medium section and the reading/writing section of the key data recording device has the same standard as that of the cartridge casing of the cartridge storing device, so that the key data recording device can be accommodated in the library unit 2 in the same manner as the cartridge storing device. That enables the reading/writing section to read and write key data of encrypted data stored in a cartridge storing device from and into the key data recording medium section of the key data recording device accommodated in the library unit. In addition, the key data deleting section deletes the key data when the casing is taken out of the library unit, so that leaking of the key data can be avoided. Accordingly, since the encrypted data stored in the cartridge storing device is not decrypted unless the key data is read, the confidentiality of the encrypted data is further enhanced.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present inventions have been described in detail, it should be understood that the various changes, substitutions, and alterations could be made hereto without departing from the spirit and scope of the invention.

What is claimed is:

1. An apparatus for storing key data of encrypted data, comprising:
    a cartridge casing accommodatable in a library unit;
    a key data recording medium section which is contained in the cartridge casing and which stores the key data of the encrypted data;
    a reading/writing section which is contained in the cartridge casing and which reads and writes the key data from and into the key data recording medium section;
    a first power supplying terminal which supplies power from a first power supplying section to the key data recording medium section contained in the cartridge casing in a state of being accommodated in a storage shelf of the library unit; and
    a second power supplying terminal which supplies power to the key data recording medium section from a second power supplying section,
    wherein
    the key data recording medium section is a volatile recording medium in which power supply through the first power supplying terminal or the second power supplying terminal is stopped when the cartridge casing is irregularly ejected from the library unit and the key data is deleted, the first power supplying section is included in the storage shelf, and the second power supplying section is included in a gripper of a transferring device that moves the cartridge casing.

2. The apparatus according to claim 1, wherein:

an access to the key data recording medium section while power is supplied to the volatile recording medium is verified with a certificated key previously prepared; and when the access is judged to be an unauthorized access, power supply from the power supplying terminal to the volatile recording medium is stopped.

3. The apparatus according to claim 1, further comprising a switch which is disposed on a power supplying line interposed between the second power supplying terminal and the key data recording medium section, which verifies an access to the reading/writing section while power is supplied to the key data recording medium section with a certificated key previously prepared, and which, when the access is judged to be an unauthorized access, stops supplying power to the volatile recording medium from the second power supplying terminal.

4. The apparatus according to claim 1, wherein the reading/writing section comprises:

a receiver which receives the key data;

a controller which controls storing the key data into the key data recording medium section and reading the key data from the key data recording medium section; and a transmitter which transmits the read key data.

5. The apparatus according to claim 4, wherein the reading/writing section is an IC tag or an IC card.

6. A method for managing key data comprising:

storing key data of encrypted data recorded in cartridge storing device accommodated in a storage space of a library unit into a recording medium which is a volatile recording medium and deletes data stored therein when power supply to the recording medium is stopped;

accommodating the recording medium into the storage space and supplying power from a first power supplying section included in the storage space through a first power supplying terminal to the recording medium to retain the key data; and stopping, when a transferring device of the library unit ejects the recording medium from the storage space without verification with a certificated key previously prepared, power supply from a second power supplying section included in a gripper of the transferring device through a second power supplying terminal to the recording medium.

7. A method for managing key data comprising:

storing key data of encrypted data recorded in cartridge storing device accommodated in a storage space of a library unit into a recording medium which is a volatile recording medium and deletes data stored therein when power supply to the recording medium is stopped;

accommodating the recording medium into the storage space and supplying power from a first power supplying section included in the storage space through a first power supplying terminal to the recording medium to retain the key data; and outputting, when a request for output of the key data stored in the recording medium is verified with a certificated key previously prepared and is judged to be valid, the key data, keeping power supply from a second power supplying section included in a gripper of the transferring device through a second power supplying terminal to the recording medium.

\* \* \* \* \*